Figure 1:
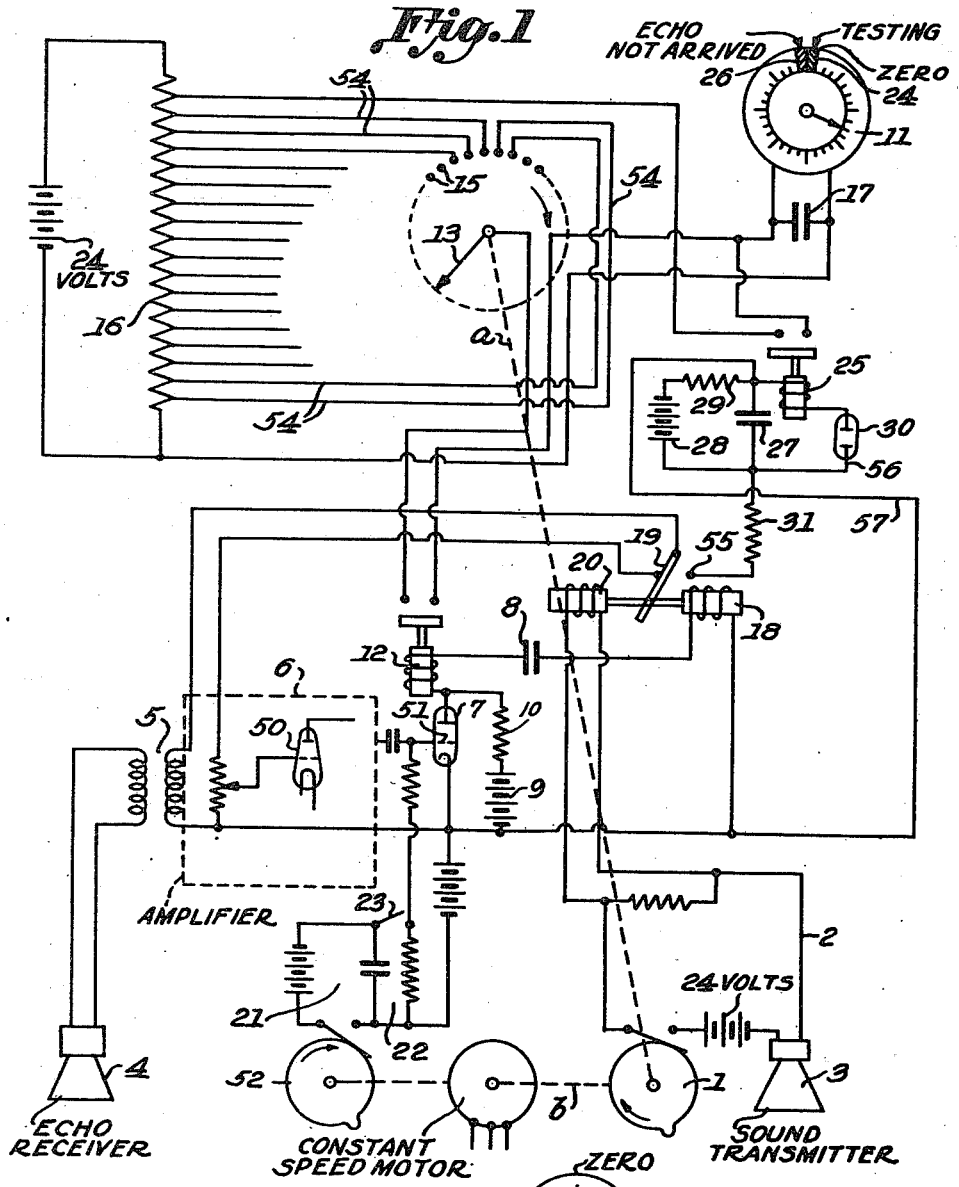

Patented Feb. 4, 1947

2,415,119

UNITED STATES PATENT OFFICE 2,415,119

APPARATUS FOR MEASURING DISTANCES

Robert Wellenstein, Bremen, Germany; vested in the Alien Property Custodian

Application July 5, 1939, Serial No. 282,916
In Germany July 8, 1938

8 Claims. (Cl. 177—352)

The present invention relates to apparatus for measuring distances by the echo sounding method, by which sounds are emitted at certain intervals and the time required for the arrival of the echo from an object, whose distance is to be ascertained, serves as a measure for this distance, which is indicated on a scale by the echo impulse.

In order to retain the indications of the echo impulses occurring at very short intervals, it has been proposed to construct the indicating device in such a way that an indication remains visible beyond the duration of the echo impulse and is removed only by means of a device actuated by a subsequent echo impulse. With this arrangement, it has been found that uncertainties are liable to occur owing to the fact that the indication, after the echo impulse has ceased, remains at the value corresponding to the last echo. The observer in an aeroplane, for example the pilot, will see from the unchanged indication that, for example, if flying beyond a certain altitude which is in the upper portion of the measuring range, no echoes arrive or that the echoes do not cause the device to respond. However, it may also occur that this cannot be discerned or not soon enough.

In order to preclude such uncertainties in reading the indication, the present invention provides an electric circuit which is interrupted or closed or influenced in any manner only in the case of echoes arriving in a certain order of succession, and which is arranged so that, if not influenced owing to non-arrival of echoes, after a certain time it removes the existing indication or produces an indication showing that the echoes do not arrive. In this way it is attained that the indication is removed or some other sign is given if during a certain period no echoes have arrived or if those received have not caused the device to respond.

Advantageously the removal or shifting of the indication is effected only after several echoes have failed to arrive, as in most cases it is not desired to have the indication removed if one single echo has failed to arrive. Thus, in the case of echo-sounding from an aeroplane it may occur frequently that some echoes do not arrive at the upper mark of the indicating range, which would not render useless the existing indication. It is, therefore, advisable to construct the device in such a way that an indication is not immediately removed if some echoes fail to arrive, but the existing indication is removed only in case of non-arrival of a number of successive echoes. This is an advantage, particularly if the indication is effected by a pointer instrument, for example a voltmeter, as the pointer system, by rapidly switching off and on in each case of non-arrival of an echo, is subjected to such vibrations that it will take some time before it will come to rest. These vibrations are especially large, as the non-arrival of echoes mostly occurs in the upper portion of the measuring range so that the pointer, each time the current is interrupted, has to move along the whole scale to reach the zero-position. Therefore, it is advantageous not to let the pointer return to the zero-position each time an echo fails to arrive, but to shift the existing indication to a place above the measuring range. In this way, the deflection of the indicating system is reduced to a minimum, bringing the system more rapidly to rest than when completely removing the existing indication. In addition, there is the advantage that the observer immediately knows, from the position of the indication, the condition of the echo sounding device.

Figure 2:
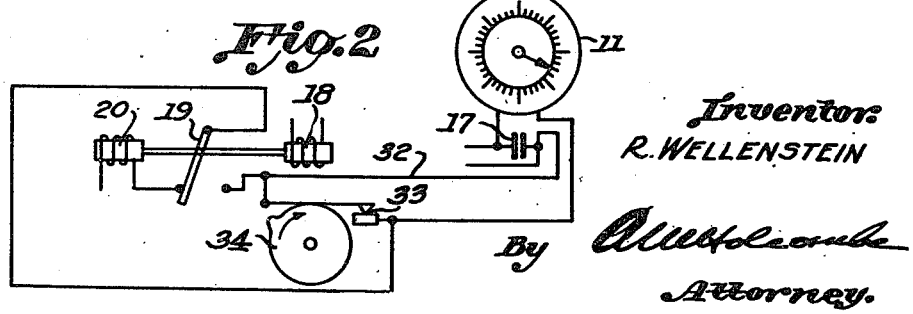

The invention is illustrated by two constructional examples in the accompanying drawing in which:

Fig. 1 is the circuit diagram of an echo sounding device with a voltmeter as indicator, and Fig. 2 is a part of the echo sounding device in a second form of construction.

The illustrated device serves for measuring distance by the echo sounding method and will be described in its application to echo sounding from aeroplanes for measuring the altitude.

By means of a contact transmitter 1, revolving at a uniform speed and driven by a motor a circuit 2 is momentarily completed, which actuates a sound emitter 3, for example a whistle for emitting a short sound impulse from the aeroplane directed towards the surface of the earth. The sound ray reflected by the surface of the earth upon arrival at a receiver 4, is transformed into electric energy which passes through an input transformer 5 to the first tube 50 of an amplifier 6. The amplified echo impulse is conducted from the amplifier to the grid 51 of a thyratron tube 7. The thyratron tube is in the discharge circuit of a condenser 8 which is charged by a source of potential 9 via a resistance 10. The discharge current impulse is used for controlling the actual indicating device.

For the purpose of ascertaining the time which lapses from the emission of the sound impulse up to the arrival of the echo, as a measure of the distance covered by the sound or the altitude of the aeroplane, chronometers of known construction can be employed. In the form of construction shown in Fig. 1, the indication is effected by a voltmeter 11 which, at the moment of the arrival of the echo, is momentarily connected across portions of a potentiometer 16 by means of a rotating arm 13 sweeping over contacts 15 and a relay 12. The arm 13 is driven in synchronism with the cam by a shaft indicated at a. The arm 13 thus serves for impressing a voltage across the voltmeter 11 which is in proportion to the time elapsed between the emission of sound and the arrival of the echo whereby the voltmeter will provide an indication of the distance of the apparatus from the sound reflecting surface. The cam 1 is also coupled to a cam disk 52 by means of a shaft represented diagrammatically at b. The contacts 15 are connected to different taps of the potentiometer 16 by means of conductors 54. By unequal distribution of the potentiometer taps and of the collector contacts 15, the accuracy of reading as well as the accuracy of measuring in the various ranges of the scale can be divided so as to suit the respective purpose in the most favorable manner.

For obtaining a prolonged indication, a condenser 17 is connected in parallel to the voltmeter 11, the condenser 17 being charged during the short period of connection and contact by the arm 13, whereby the respective potential value is retained until the next echo is indicated.

In the circuit of the thyratron tube 7 there is a second relay coil 18 for actuating the switch 19 (echo-protective-switch) which is connected to one terminal of the secondary coil of the input transformer 5 and in one position joins this coil to the grid of the first amplifying tube 50, and in the other position disconnects the coil from the grid of the amplifying tube, so that no amplification of the echo indication can be effected. When the condenser 8 is discharged owing to ignition of the thyratron tube 7 by an echo impulse, the switch 19 is moved into engagement with a contact 55 by the relay coil 18. In this position of the switch 19 the secondary winding of the transformer 5 is shunted through a resistor 31 and a condenser 27. The switching relay or the switch 19 is arranged in such a manner that it remains in its existing position in which the amplifier remains inoperable after the arrival of the echo. In this way, it is attained that only the first echo is indicated by the voltmeter 11. Therefore, multiple echoes, occurring in a particularly intense degree in aeroplane sounding, do not affect the indication. Only with the next sound emission the switch 19 is brought into the other position shown in the drawing by means of a second relay coil 20, so that the receiving device is ready to indicate the next echo.

With each sounding, the sensitivity of the device is readjusted to the existing altitude, the adjustment of the sensitivity being effected by regulating the negative grid bias of the thyratron tube 7 by means of a charging circuit 21 and a discharging circuit 22, controlled in the rhythm of the soundings.

For testing the echo sounding device, a switch 23 is provided in the discharge circuit 22 by which the regulation of the negative grid bias can be disconnected, so that the thyratron tube continuously operates with the highest sensitivity. The distance to be covered by the direct sound from the emitter to the receiver is smaller than the distance covered by the sound to the surface of the earth and back to the receiver, when the aeroplane rests on the earth in which case the altitude is zero. Therefore, the test indication is not within the scale of altitudes but is in the range marked 24 "Testing" below the zero-point of the scale of altitudes.

When the altitude of an aeroplane exceeds a certain limit, the echoes cannot cause the device to respond. Then, the indication on the voltmeter 11 remains at the last value indicated and there is the danger of concluding that the altitude is unchanged. An unchanged indication of altitude would cause uncertainty as to whether the altitude is actually constant or whether the indication has remained owing to non-arrival of echoes.

In order to preclude this uncertainty, a relay 25 is provided which in the case of non-arrival of several echoes momentarily connects the voltmeter 11 and the condenser 17 to a potential above the range of potentials utilized for indicating. Accordingly, the scale of the indicator of altitudes is provided with an indicating range adjoining the top of the scale of altitudes marked 26 "Echo not arrived." The relay 25 is in the discharge circuit of the condenser 27 which is charged by a source of potential 28 via a resistance 29. The discharge is effected by a glow tube 30 which is ignited when a certain limiting voltage is exceeded and thereby causes a sudden discharge current to actuate the relay 25. Parallel to the discharge circuit 56, there is a second discharge circuit 57 which, on arrival of an echo, is closed by the polarized relay 19 provided for protection from re-echoes. The discharge resistance of this circuit 57 consists of the resistance of the secondary coil of the input transformer 5 and the resistance 31, and is so dimensioned that, in the case of regular arrival of echoes, the condenser 27 cannot be charged up to the limiting voltage required for igniting the tube 30 via the relay 25. This limiting voltage is only reached if the discharge via the resistance 31 is not effected owing to non-arrival of echoes during several, for example three, successive sounding periods.

Fig. 2 shows a connection in which an indicating circuit 32 is interrupted, whereby the indication is removed as soon as only one echo has failed to arrive. The connection consists of a current shunt in one branch of which is located the echo protection switch 19, and in the other branch a key 33 which is momentarily opened immediately before each sound emission by a cam 34 revolving in the rhythm of the soundings. If no echo has arrived up to then, the switch 19 lies on the left, and the circuit 32 is interrupted.

In operation of the circuit arrangement shown in Fig. 2; on separation of the contacts 33, which occurs at each revolution of the controlling cam, and with the contact 19 in the left hand position which is the position for receiving the echo, the indicating circuit is opened and the indicator returned to zero no signal position. With the system shown in Fig. 1 this position would be in the lower portion of the testing range 24 or in a position where no indication whatever is given. As the successive opening and closing of contacts 33 generally occurs in rapid succession, any sudden movement of the indicator to zero position from a previous position indicating substantial altitude would in general indicate the failure of an echo to arrive at the receiving apparatus. If the echo has been received prior to the opening of the contacts 33 the arm 19 will then be at its right hand position and the opening of the contacts will have no effect on the indicating circuit.

The invention is not confined to the example illustrated. There are various possible modifications and other forms of construction.

It is essential that the device producing the indication of the echo impulse act suddenly so that the indication is particularly distinct and does not appear like a gradual change of altitude.

What I claim is:

1. Apparatus for measuring distances by an echo method comprising, sound transmitting means operable to project a sound impulse at uniform intervals. means for receiving said sound impulses from a reflecting surface, a voltmeter having a scale thereon calibrated in distances, means operable upon the arrival at the receiving means of a reflected sound impulse for impressing a voltage across said voltmeter proportional to the time elapsed between the emission of a sound impulse by said sound transmitting means and the arrival of the reflection of said impulse at the receiving means, a condenser connected across the voltmeter to provide a continuing indication by said voltmeter, and means operable upon the non-arrival of a transmitted sound impulse at the receiving means for altering the voltage across said voltmeter to a value different from normal voltmeter indication for reflected sound impulses.

2. Apparatus for measuring distances by an echo method comprising, means emitting sound impulses, means for receiving said sound impulses from a reflecting surface, means operable upon the arrival at the receiving means of a reflected sound impulse indicating the distance travelled by the sound impulse from the sound emitting means to the reflecting surface, means maintaining the operation of said indicating means to provide a continuing indication of said distance, and means operable upon non-arrival of further reflected sound impulses for rendering said maintaining means inoperative.

3. Apparatus for measuring distances by an echo method comprising. means emitting sound impulses, means for receiving said sound impulses from a reflecting surface. means operable upon the arrival at the receiving means of a reflected sound impulse momentarily indicating the distance travelled by the sound impulse from the sound emitting means to the reflecting surface, means connected to said indicating means for maintaining the operation of said indicating means to provide a continuing indication of said distance, and means operable upon non-arrival of further reflected sound impulses for disconnecting the maintaining means from the indicating means.

4. Apparatus for measuring distances by an echo method comprising, means emitting sound impulses, means for receiving said sound impulses from a reflecting surface, means operable upon the arrival at the receiving means of a reflected sound impulse momentarily indicating the distance travelled by the sound impulse from the sound emitting means to the reflecting surface, means connected to said indicating means for maintaining the operation of said indicating means to provide a continuing indication of said distance, a normally open switch adapted to be closed upon the arrival of a reflected impulse, a second normally closed switch. means for opening the second switch immediately before the emission of a sound impulse, and a circuit connecting said switches in parallel between the indicating means and the maintaining means.

5. Apparatus for measuring distances by an echo method comprising, means emitting sound impulses at uniform intervals, means for receiving said sound impulses from a reflecting surface, means operable upon the arrival at the receiving means of a reflected sound impulse indicating the distance travelled by the sound impulse from the sound emitting means to the reflecting surface, means maintaining the operation of said indicating means to provide a continuing indication of said distances, a time delay circuit, means responsive to the arrival of a reflected sound impulse in the receiving means for initiating operation of the time delay circuit, and means operable after the initial operation of the time delay circuit and in the absence of further reflected sound impulses for operating the indicating means to show the non-arrival of reflected sound impulses in the event that no reflected impulse is received.

6. Apparatus for measuring distances by an echo method comprising, sound transmitting means operable to project a sound impulse at uniform intervals, means for receiving said sound impulses from a reflecting surface, a voltmeter having a scale thereon calibrated in distance, means operable upon the arrival of a reflected sound impulse at the receiving means for momentarily impressing a voltage across said voltmeter proportional to the time elapsed between the emission of a sound impulse by said transmitting means and the arrival of the reflection of said impulse at said receiving means, a condenser connected across said voltmeter, a time delay circuit including a second condenser and means for charging the second condenser, means responsive to the arrival of a reflected sound impulse for initiating the discharging of said second condenser, and means responsive to a predetermined charge of the second condenser and the discharge thereof for impressing a greater than the maximum normal voltage across said voltmeter to indicate the non-arrival of reflected sound impulses in the event that no reflected impulse is received.

7. Apparatus for measuring distances by an echo method comprising, sound transmitting means operable to project a sound impulse at uniform intervals, means for receiving said sound impulses from a reflecting surface, a voltmeter having a scale thereon calibrated in distance, means operable upon the arrival of a reflected sound impulse at the receiving means for momentarily impressing a voltage across said voltmeter proportional to the time elapsed between the emission of a sound impulse by said transmitting means and the arrival of the reflection of said impulse at said receiving means, a condenser connected across said voltmeter to provide a continuing indication by said voltmeter, a second condenser, means for initiating the discharging of the second condenser upon the arrival of a reflected sound impulse in the receiving means, a circuit connected to said condenser, a relay in said circuit actuated upon the discharge of said second condenser, and means for impressing a greater than the maximum normal voltage across said voltmeter upon the actuation of said relay in the event that no reflected impulse is received.

8. Apparatus for measuring distances by an echo method comprising, sound transmitting means operable to provide a sound impulse at uniform intervals, means for receiving said sound impulses from a reflecting surface, a circuit connected to said receiving means including a charged condenser therein, a voltmeter having a scale thereon calibrated in distance, a relay in said circuit, means for discharging said condenser upon the arrival of a reflected sound impulse in the receiving means, means operable upon the actuation of said relay for momentarily impressing a voltage across said voltmeter proportional to the time elapsed between the transmission of a sound impulse and the arrival of the reflection of said sound impulse in the receiving means, a second condenser connected across the voltmeter to provide a continuing indication by said voltmeter, and means operable at a predetermined time interval, which is greater than the expected maximum interval between transmission of said sound impulse and arrival of its reflection, after the transmission of a sound impulse for impressing a greater than the maximum normal voltage across said voltmeter in the event that no reflected impulse is received.

ROBERT WELLENSTEIN.

REFERENCES CITED

The following references are of record in the file of this patent:

UNITED STATES PATENTS

| Number | Name | Date |
| --- | --- | --- |
| 2,120,971 | Bailey | June 21, 1938 |
| 2,144,843 | Hearn | Jan. 24, 1939 |

FOREIGN PATENTS

| Number | Country | Date |
| --- | --- | --- |
| 406,592 | British | Mar. 1, 1934 |
| 589,368 | German | Dec. 6, 1933 |
| 406,368 | British | Mar. 1, 1934 |